(12) United States Patent
Chen

(10) Patent No.: US 9,099,902 B2
(45) Date of Patent: Aug. 4, 2015

(54) AIRCRAFT VEHICLE AND A FIXING SLEEVE

(71) Applicant: Shenzhen Hubsan Technology Co., Ltd., Shenzhen (CN)

(72) Inventor: Guangyao Chen, Shenzhen (CN)

(73) Assignee: SHENZHEN HUBSAN INTELLIGENT CO., LTD., Shenzhen (CN)

( * ) Notice: Subject to any disclaimer, the term of this patent is extended or adjusted under 35 U.S.C. 154(b) by 97 days.

(21) Appl. No.: 14/127,186

(22) PCT Filed: Oct. 22, 2013

(86) PCT No.: PCT/CN2013/085657
§ 371 (c)(1),
(2) Date: Dec. 18, 2013

(87) PCT Pub. No.: WO2015/058352
PCT Pub. Date: Apr. 30, 2015

(65) Prior Publication Data
US 2015/0108862 A1  Apr. 23, 2015

(51) Int. Cl.
*B64C 27/08* (2006.01)
*H02K 5/22* (2006.01)
*B64C 39/02* (2006.01)

(52) U.S. Cl.
CPC .............. *H02K 5/22* (2013.01); *B64C 39/024* (2013.01)

(58) Field of Classification Search
CPC ...................................................... B64C 39/024
USPC ........................................ 244/17.23, 17.27
See application file for complete search history.

(56) References Cited

U.S. PATENT DOCUMENTS

| 8,774,982 | B2* | 7/2014 | Oakley et al. ..................... 701/2 |
| 8,794,564 | B2* | 8/2014 | Hutson ....................... 244/17.17 |
| 8,794,566 | B2* | 8/2014 | Hutson ....................... 244/17.23 |
| 8,931,730 | B2* | 1/2015 | Wang et al. ................. 244/17.17 |
| 9,016,617 | B2* | 4/2015 | Wang et al. ................. 244/17.17 |
| 2010/0243794 | A1 | 9/2010 | Jermyn |

FOREIGN PATENT DOCUMENTS

| CN | 201320404 Y | 10/2009 |
| CN | 201643707 U | 11/2010 |

(Continued)

*Primary Examiner* — Timothy D Collins
*Assistant Examiner* — Keith L Dixon
(74) *Attorney, Agent, or Firm* — IPro, Inc.; Na Xu

(57) ABSTRACT

This disclosure provides an aircraft vehicle, which comprises a circuit board, and at least one power component mounted on said circuit board. The at least one power component comprises a rotor, a drive unit and a fixing sleeve. Said drive unit is electrically connected to said circuit board and drives the rotor to rotate. Said fixing sleeve comprises a receiving space with an opening at a top. Said fixing sleeve comprises at least one first stopping piece and at least one second stopping piece projected on an outer surface of the fixing sleeve. Said drive unit is accommodated in the receiving space and is secured in the fixing sleeve. Said circuit board comprises at least one positioning hole corresponding to the power component. The fixing sleeve is configured to pass through the positioning hole so that the circuit board is retained between the first stopping piece and the second stopping piece. This disclosure also provides a fixing sleeve. Thus, when the aircraft vehicle falls or collides with another object, the fixing sleeve ensures that the drive unit does not separate from the circuit board, therefore enhancing the performance of the aircraft vehicle.

30 Claims, 13 Drawing Sheets

(56) References Cited

FOREIGN PATENT DOCUMENTS

| CN | 203064201 U | 7/2013 |
| CN | 203090471 U | 7/2013 |
| CN | 103350752 A | 10/2013 |

* cited by examiner

US 9,099,902 B2

AIRCRAFT VEHICLE AND A FIXING SLEEVE

TECHNICAL FIELD

The disclosure herein relates to the field of electronic toys, in particular to an aircraft vehicle and a fixing sleeve.

BACKGROUND

With the development of technology and the continuous improvement of people's living standard, electronic toys become more and more abundant. As a high-end electronic toy, an aircraft vehicle is favored by the majority of model aircraft enthusiasts.

An aircraft vehicle typically comprises a circuit board, a plurality of motors mounted on said circuit board, and a plurality of rotors controlled by the plurality of motors. In the prior art, the motor is usually positioned on the circuit board by way of an interference fit. Using this fixing method, the motor and the circuit board often become loose and separated when consumers use the aircraft vehicle, since the aircraft vehicle frequently fall or collide with the surrounding objects; and this in turn often affects the performance.

SUMMARY

The present invention is to solve the technical problem that a motor of an aircraft vehicle in the current prior art is likely to become loose and separated from the circuit board, which affects the performance of the aircraft vehicle.

To solve the above technical problem, the present invention provides the following technical solutions.

This disclosure provides an improved aircraft vehicle, which comprises a circuit board, and at least one power component mounted on said circuit board. Each of the at least one power component comprises a rotor, a drive unit and a fixing sleeve. Said drive unit is electrically connected to said circuit board and drives the rotor to rotate. Said fixing sleeve comprises a receiving space with an opening at a top. Said fixing sleeve comprises at least one first stopping piece and at least one second stopping piece projected on an outer surface of the fixing sleeve. Said drive unit is configured to be accommodated in the receiving space and is configured to be secured in the fixing sleeve. Said circuit board comprises at least one positioning hole corresponding to the power component, and the fixing sleeve is configured to pass through the positioning hole so that the circuit board is retained between the first stopping piece and the second stopping piece.

Preferably, the fixing sleeve comprises a base and a pair of oppositely positioned walls, wherein each said wall extends from an edge of the bottom. Said base and said walls together form said receiving space. The second stopping piece is provided on an outer surface of the wall. The first stopping piece is provided between said walls.

Preferably, a pair of oppositely positioned first notches is formed between the walls. The fixing sleeve comprises a pair of first stopping pieces. Each of the first stopping pieces bends and extends respectively from a bottom of the first notch toward a top of the fixing sleeve. The circuit board is configured to be retained between an end of the first stopping piece and the second stopping piece.

Preferably, the size of the first notch gradually decreases from a top toward a bottom of the fixing sleeve.

Preferably, a gap forms between said first stopping piece and the walls.

Preferably, an inside of the receiving space of the fixing sleeve is provided with steps. An end of the wall extends radially toward a center of the receiving space to form a stopping block. The drive unit is secured between the steps and the stopping block.

Preferably, a projected piece is provided on an outer surface of the wall. An inner wall of the positioning hole is provided with a positioning groove in communication with the positioning hole. The projected piece is accommodated in the positioning groove.

Preferably, the aircraft vehicle comprises a pair of first power components and a pair of second power components. The circuit board further comprises a main body, a pair of first support arms that corresponds to the pair of the first power components, and a pair of second support arms that corresponds to the pair of the second power components. The first support arms and the second support arms extend away respectively from edges of the main body in a radial direction. Wherein, one of the first support arms and one of the second support arms are aligned on a straight line, and the other one of the first support arms and the other one of the second support arms are aligned on another straight line. The circuit board further comprises two pairs of positioning holes respectively provided on ends of the first support arms and ends the second support arms.

Preferably, the first support arms and the second support arms form a X-shape with the main body as a center of said X-shape.

Preferably, the first support arms and the second support arms are provided respectively with hollow regions.

Preferably, the aircraft vehicle further comprises a battery and a battery cover. The battery is secured on the main body of the circuit board. The battery cover shields the battery and is secured on the circuit board.

Preferably, the battery cover comprises a cover body and a plurality of hooks corresponding to the hollow regions. A hook is formed by extending and projecting from an edge of the cover body. The battery is configured to be accommodated inside the cover body, and the hooks are configured to insert into the corresponding hollow regions to hold against the bottom of the circuit board.

Preferably, the cover body comprises a plurality of second through holes.

Preferably, the aircraft vehicle is configured to be mounted on a support box. The support box comprises a body with an opening at its bottom. A top of the body has a pair of first positioning portions corresponding to the first power components, and a pair of second positioning portions corresponding to the second power components. The fixing sleeve further comprises a pair of retaining pieces at the bottom of the fixing sleeve. The first positioning portion is configured to engage with the corresponding retaining pieces of the fixing sleeve of the first power component, and the second positioning portion is configured to engage with the corresponding retaining pieces of the fixing sleeve of the second power component, to secure the aircraft vehicle on the support box.

Preferably, each of the first positioning portions comprises a first positioning groove, a tongue piece and a first locking block. Said tongue piece extends from an end of the first positioning groove in a direction parallel to the top surface of the circuit board. The first locking block is provided in a recess on another end of the first positioning groove. The retaining pieces of the fixing sleeve of the first power component are configured to clamp and be secured at a bottom of the first locking piece, and the tongue piece is configured to stop and retain the bottom of the retaining pieces of the fixing sleeve.

Preferably, each of the second positioning portions comprises a second positioning groove, a guiding piece and a second locking block. The guiding piece is provided in a recess of the second positioning groove and connects two ends of the second positioning groove. The second locking piece is provided at an end further away from the first positioning portion, and is on top of the guiding piece. The retaining pieces of the fixing sleeve of the second power component are configured to clamp and be secured at a bottom of the second locking block.

Preferably, the retaining piece extends from a bottom of the fixing sleeve away from a top of the fixing sleeve. An end of the retaining piece bends and extends radially towards a center direction of the fixing sleeve. A second notch is formed between the ends of the retaining pieces. The bottom of the fixing sleeve of the first power component is configured to press the corresponding tongue piece of the first positioning portion; said tongue piece is configured to be accommodated in the second notch of the corresponding fixing sleeve, so that the retaining pieces of the fixing sleeve are configured to slide along the tongue piece and are configured to clamp and be secured at a bottom of the corresponding first locking piece. The guiding piece of the second positioning portion is configured to be accommodated in the second notch of the corresponding fixing sleeve, so that the retaining pieces of the fixing sleeve are configured to slide along the guiding piece and are configured to clamp and be secured at a bottom of the corresponding second locking piece.

Preferably, the support box further comprises a bottom plate, wherein the bottom plate is provided at the bottom of the body and shields the body.

Preferably, the circuit board further comprises a connection terminal on a surface of the circuit board, and a projecting piece at a bottom of the circuit board. A connector corresponding to the connection terminal is provided with a receiving slot which is in communication with a jack of the connector. The connection terminal is configured to insert into the jack, and the projecting piece is configured to be accommodated in the receiving slot, so that the connector is electrically connected to the connection terminal.

Preferably, the connection terminal comprises a pair of copper foils printed on the circuit board.

Preferably, the connection terminal is a charging terminal of the aircraft vehicle.

Preferably, the drive unit is a motor, and the motor is cylindrical in shape.

In another aspect, the disclosure provides a fixing sleeve, wherein the fixing sleeve is configured to secure a power component of an aircraft vehicle on a circuit board, and the power component comprises a rotor and a drive unit that drives the rotor to rotate. Said circuit board comprises positioning holes. Said drive unit is configured to be electrically connected to the circuit board. Said fixing sleeve comprises a receiving space with an opening at a top. Said fixing sleeve comprises at least one first stopping piece and at least one second stopping piece projected on an outer surface of the fixing sleeve. Said drive unit is configured to be accommodated in the receiving space and secured in the fixing sleeve. Said circuit board comprises at least one positioning hole corresponding to the power component, and the fixing sleeve is configured to pass through the positioning hole so that the circuit board is configured to be retained between the first stopping piece and the second stopping piece.

Preferably, the fixing sleeve comprises a base and a pair of oppositely positioned walls, wherein each said wall extends from an edge of the bottom. Said base and said walls together form said receiving space. The second stopping piece is provided on an outer surface of the wall. The first stopping piece is provided between said walls.

Preferably, a pair of oppositely positioned first notches is formed between the walls. The fixing sleeve comprises a pair of first stopping pieces. Each of the first stopping pieces bends and extends respectively from a bottom of the first notch toward a top of the fixing sleeve. The circuit board is configured to be retained between an end of the first stopping piece and the second stopping piece.

Preferably, the size of the first notch gradually decreases from a top toward a bottom of the fixing sleeve.

Preferably, a gap forms between said first stopping piece and the walls.

Preferably, an inside of the receiving space of the fixing sleeve is provided with steps. An end of the wall extends radially toward a center of the receiving space to form a stopping block. The drive unit is configured to be secured between the steps and the stopping blocks.

Preferably, a projected piece is provided on an outer surface of the wall. An inner wall of the positioning hole is provided with a positioning groove in communication with the positioning hole. The projected piece is configured to be accommodated in the positioning groove.

Preferably, the bottom of the walls is provided with a first through hole which is in communication with the receiving space.

Therefore, the aircraft vehicle is provided with the fixing sleeve which secures the drive unit on the circuit board; the fixing sleeve is configured to be securely positioned on the circuit board through the combined action of the first stopping piece and the second stopping piece. Thus, when the aircraft vehicle falls or collides with another object, the fixing sleeve ensures that the drive unit does not separate from the circuit board, therefore enhancing the performance of the aircraft vehicle.

BRIEF DESCRIPTION OF FIGURES

In order to more clearly illustrate the technical schemes, the following embodiments are illustrated together with the accompanying drawings. It is obvious that the following descriptions of the drawings depict only some embodiments. Those skilled in the art may derive other drawings without any inventive effort from the current drawings.

DETAILED DESCRIPTION

Below is a detailed description of the embodiments of the disclosure in view of the accompanying drawings.

Figure 1:
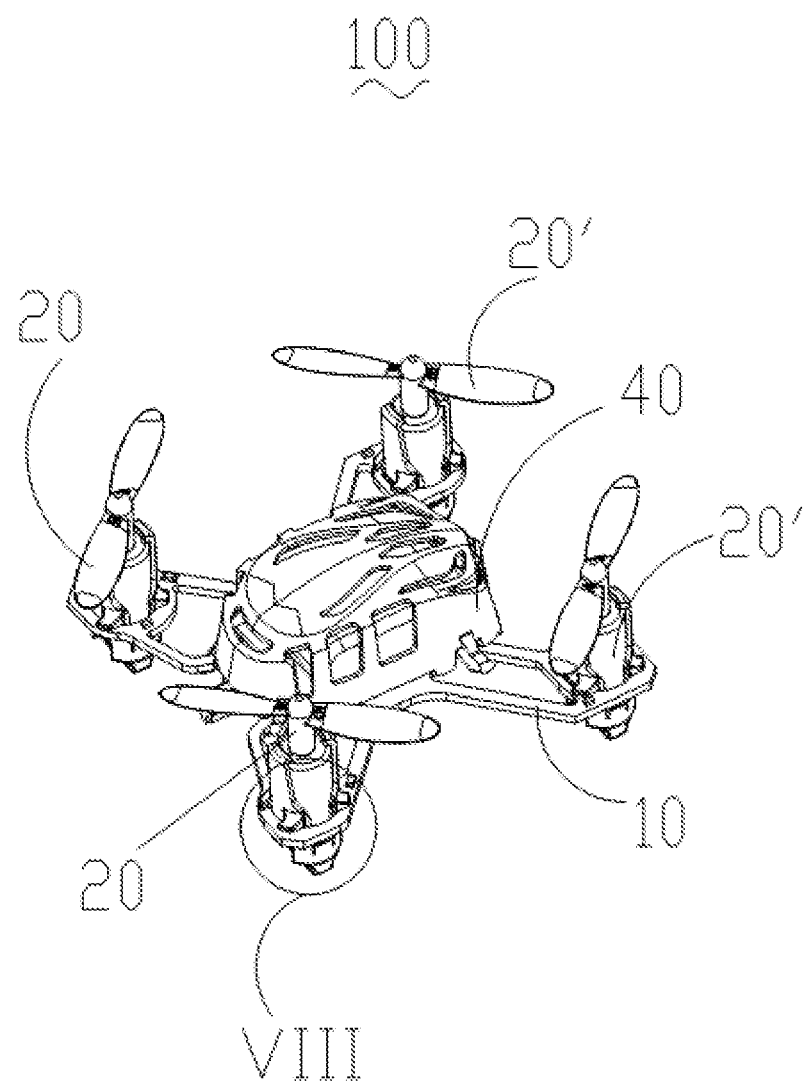
FIG. 1 is an assembly diagram of an aircraft vehicle mounted on a support box according to an embodiment.
Figure 2:
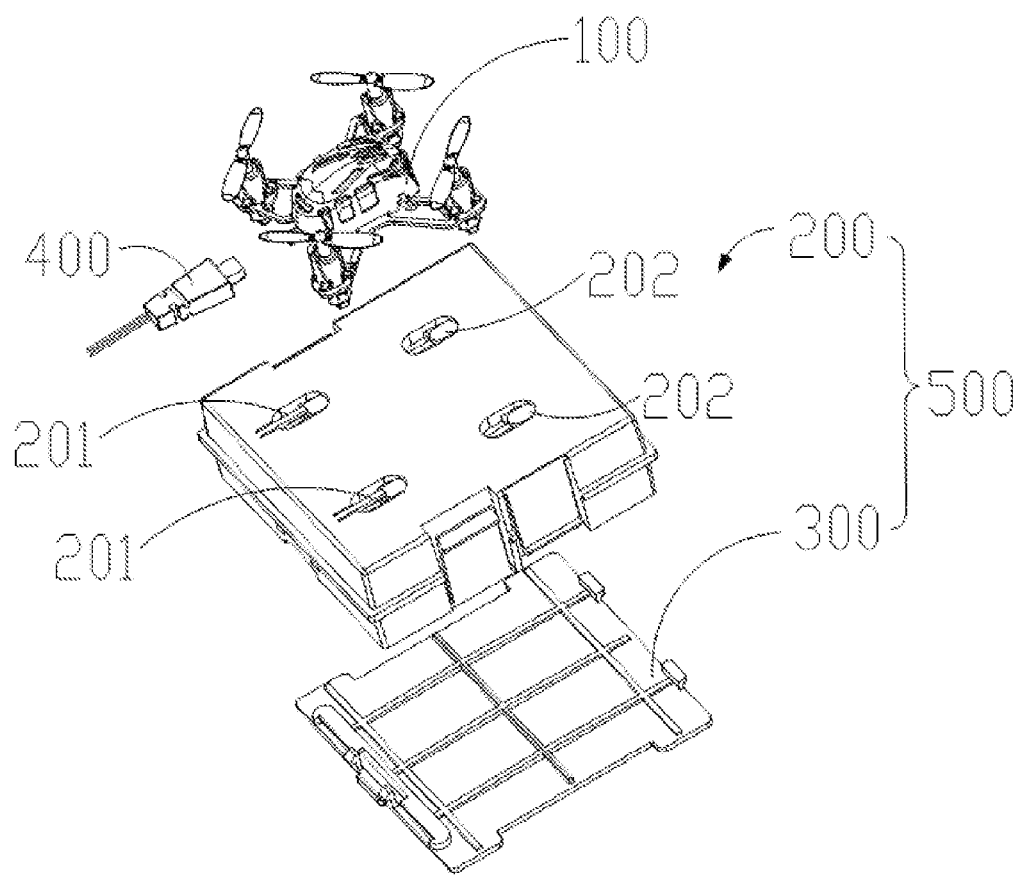
FIG. 2 is an explosion view of the support box and the aircraft vehicle of FIG. 1.

As shown in FIG. 1 and FIG. 2, according to an embodiment, an aircraft vehicle 100 is mounted on a support box 500. When the aircraft vehicle 100 is not in use, said support box 500 supports the aircraft vehicle 100. The support box 500 comprises a body 200 with an opening at its bottom, and a bottom plate 300. During installation, the aircraft vehicle 100 is positioned on the top of the body 200, and is secured on the body 200. Said bottom plate 300 is provided at the bottom of the body 200 and shields the body 200.

A connector 400 is electrically connected to the aircraft vehicle 100 to charge the aircraft vehicle 100. In an embodiment, the connector 400 comprises a USB cable.

Figure 3:
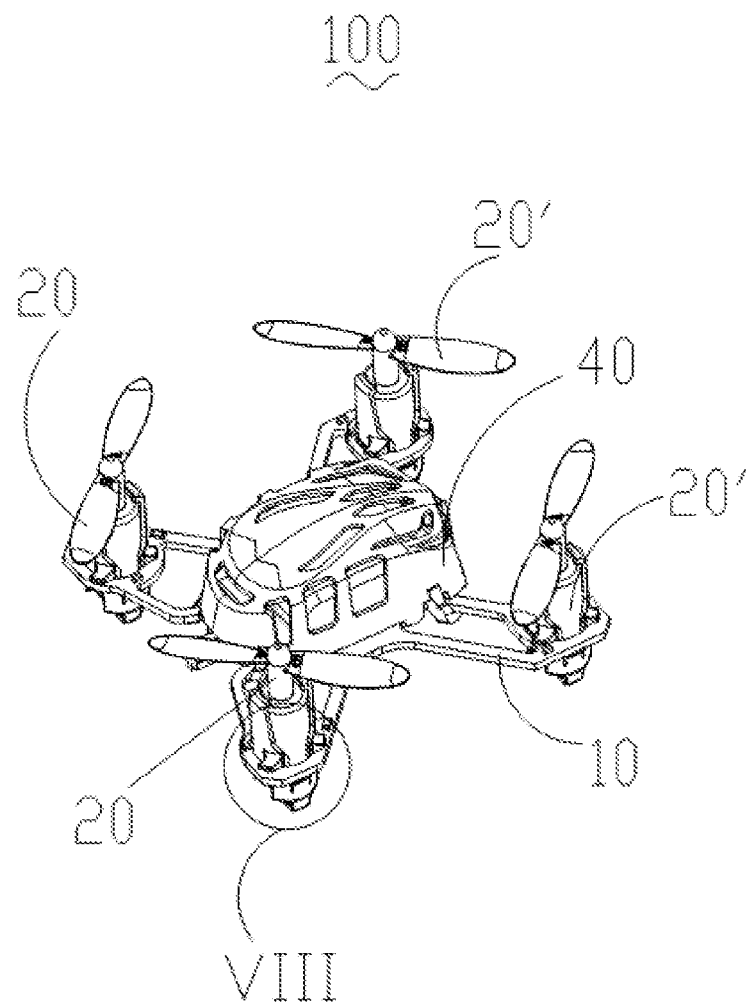
FIG. 3 is an assembly diagram of the aircraft vehicle of FIG. 1.
Figure 4:
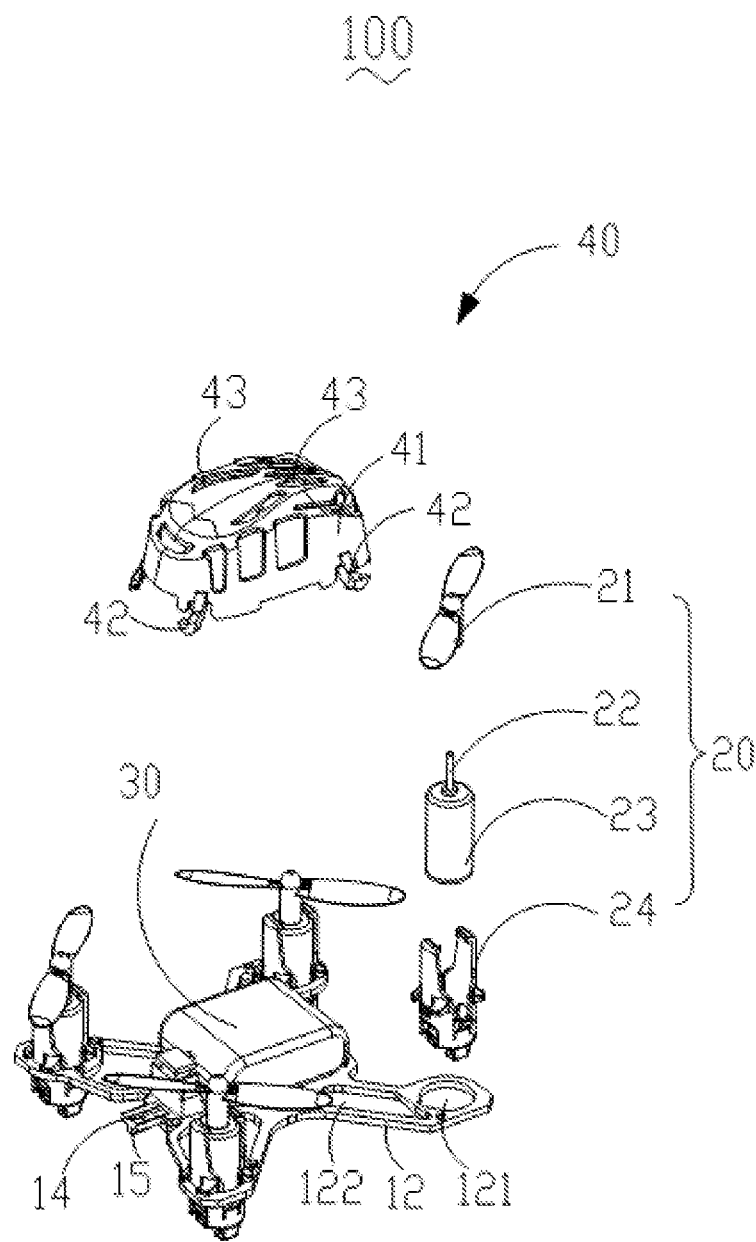
FIG. 4 is a partial explosion view of the aircraft vehicle of FIG. 3.

As shown in FIG. 3 and FIG. 4, the aircraft vehicle 100 comprises a circuit board 10 and at least one power component 20 mounted on the circuit board 10. Each power component 20 comprises a rotor 21, a drive unit 23 and a fixing sleeve 24. Said drive unit 23 is electrically connected to the circuit board 10 and drives the rotor 21 to rotate.

Figure 5:
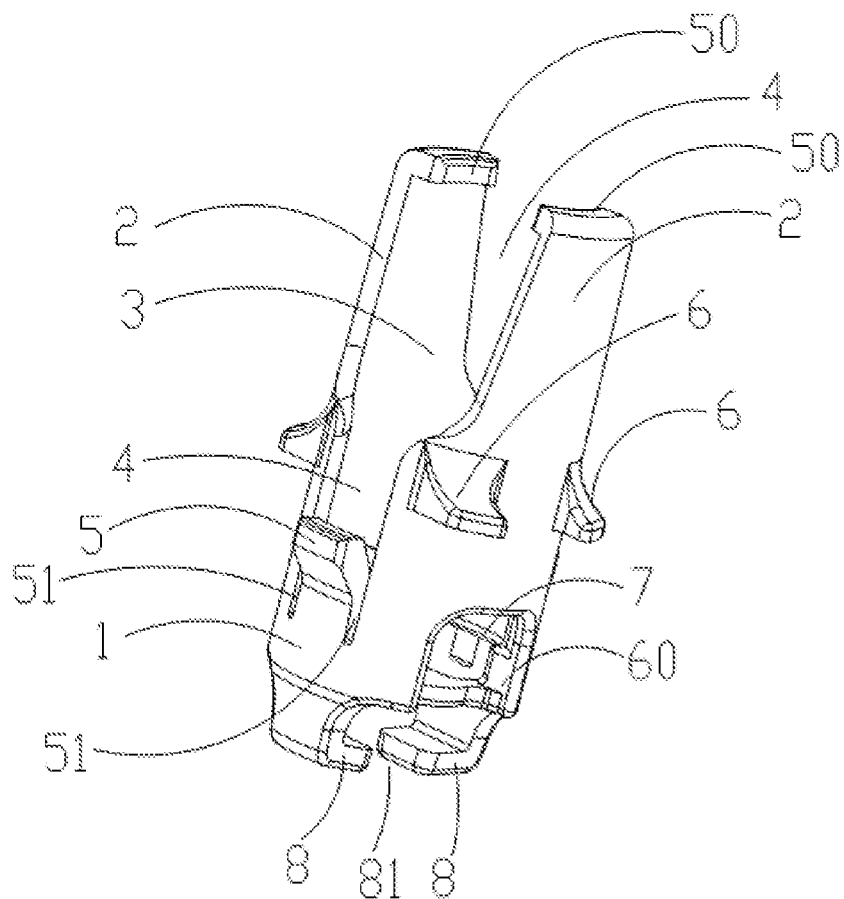
FIG. 5 is a schematic diagram of the fixing sleeve of FIG. 4.
Figure 6:
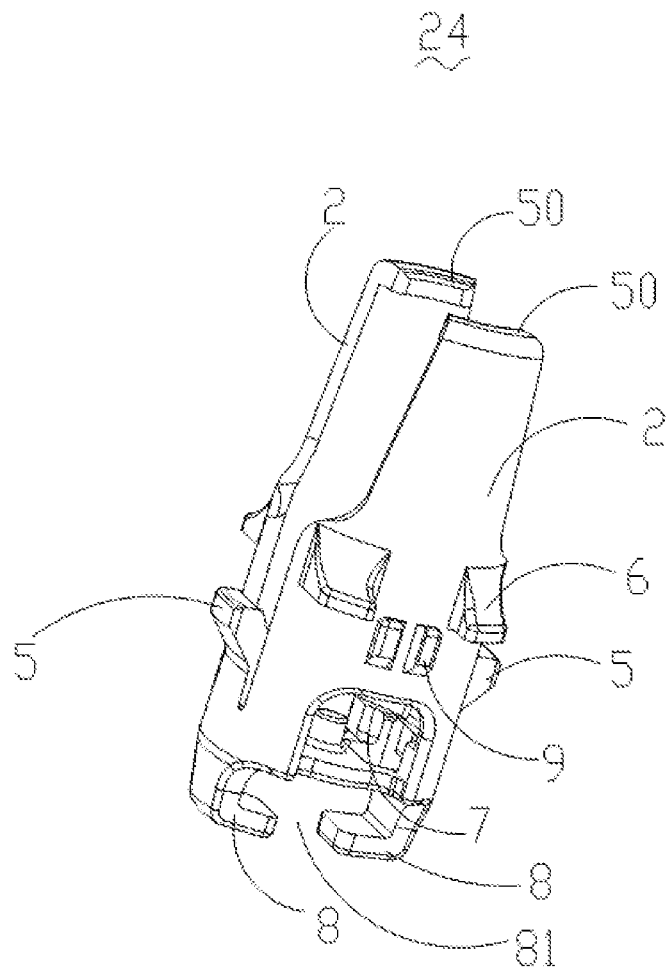
FIG. 6 is another schematic diagram of the fixing sleeve of FIG. 4 from another direction.

As shown in both FIG. 5 and FIG. 6, the fixing sleeve 24 comprises a receiving space 3 with an opening at a top. Said fixing sleeve further comprises at least one first stopping piece 5 and at least one second stopping piece 6 projected from an outer surface of the fixing sleeve 24. During installation, the drive unit 23 is accommodated in the receiving space 3 and is secured in the fixing sleeve.

Figure 7:
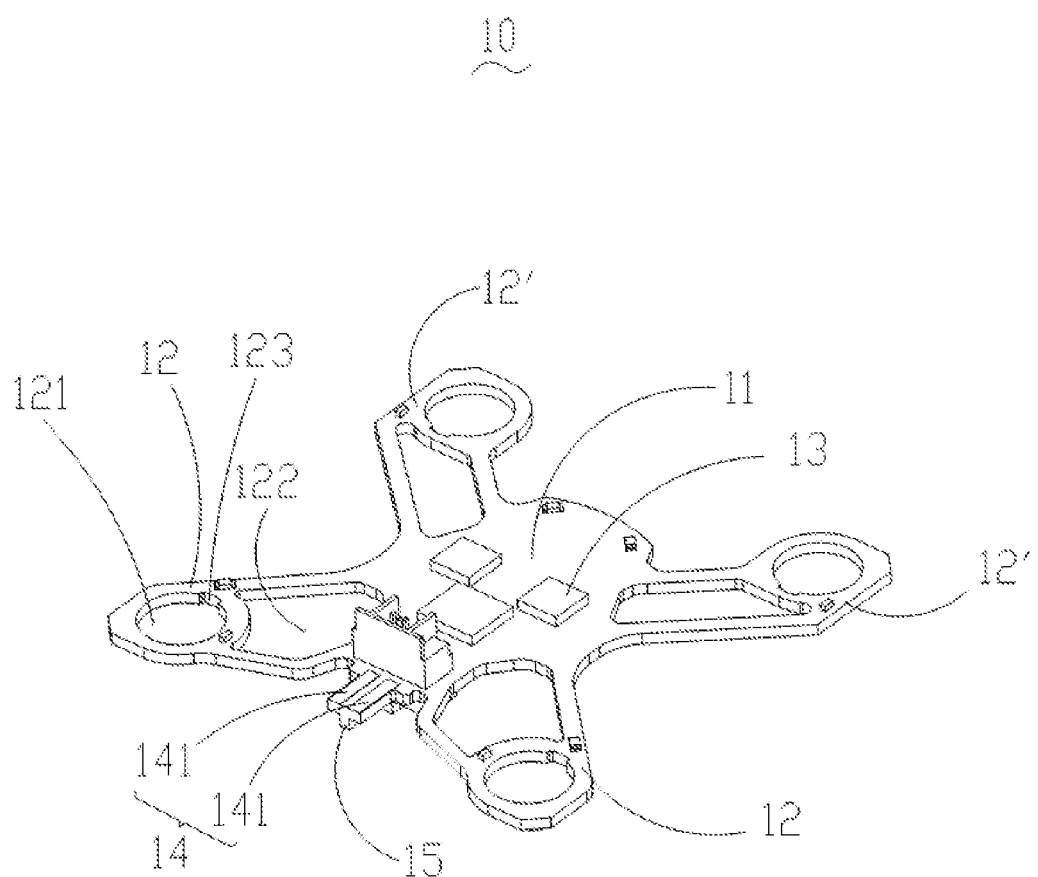
FIG. 7 is a schematic diagram of the circuit board of FIG. 4.
Figure 8:
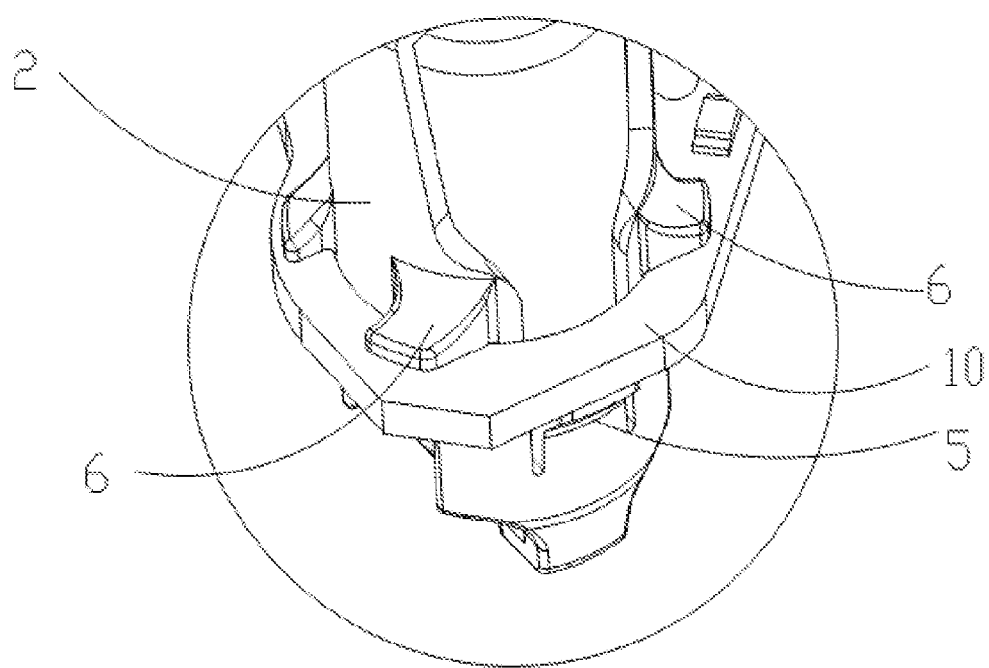
FIG. 8 is an enlarged view of the portion in the circle VIII as shown in FIG. 3.

As shown in FIG. 7, the circuit board 10 comprises at least one positioning hole 121 that corresponds to a power component 20. During installation, the fixing sleeve 24 passes through the positioning hole 121 of the circuit board 10, so that the circuit board 10 is retained between the first stopping piece 5 and the second stopping piece 6, as shown in FIG. 8.

In this embodiment, the aircraft vehicle 100 is a four-rotor aircraft vehicle 100, and accordingly, the aircraft vehicle 100 comprises two pairs of power components 20.

In other embodiments, the aircraft vehicle 100 may be other multi-rotor aircrafts. For example, it may be a two-rotor aircraft or a six-rotor aircraft.

In the present embodiment, the drive unit 23 is a motor. The motor is cylindrical in shape. The rotor 21 connects with the motor via a rotary shaft 22.

In particular, in the present embodiment, the fixing sleeve 24 is made of a plastic material with elasticity.

During installation, an end of the power component 20 with nonmoving member is aligned with a positioning hole 121; the first stopping piece 5 is pressed by an inner wall of the first positioning hole 121 to elastically deform and squeezes through the positioning hole 121. The first stopping piece 5 then restores from its elastic deformation, so that the circuit board 10 is retained between the first stopping piece 5 and the second stopping piece 6, as shown in FIG. 8.

When the power component 20 is to be removed, the first stopping piece 5 is pressed in, so that said first stopping piece 5 exits from the positioning hole 121, and the power component 20 is removed from said circuit board 10.

Thus, the present disclosure provides an aircraft vehicle 100, which secures the drive unit 23 to the circuit board 10 with the fixing sleeve 24; the fixing sleeve 24 is firmly connected on the circuit board 10 through the combined action of the first stopping piece 5 and the second stopping piece 6 together. Therefore, when the aircraft vehicle 100 drops or collides with another object, the fixing sleeve 24 can ensure that the drive unit 23 and the circuit board 10 do not separate from the aircraft vehicle 100, therefore enhancing the stability of the performance of the aircraft vehicle 100.

The fixing sleeve 24 is simple in structure and easy to be installed and removed, which improve the efficiency of assembly and maintenance of the aircraft vehicle 100.

As shown in both FIG. 5 and FIG. 6, the fixing sleeve 24 comprises a base 1 and a pair of oppositely positioned walls 2, wherein each said wall 2 extends perpendicularly from an edge of the bottom 1. Said base 1 and said walls 2 together form said receiving space 3. A first stopping piece 5 is provided between said walls 2. A second stopping piece 6 is provided on an outer surface of a wall 2.

In the present embodiment, a pair of oppositely positioned first notches 4 is formed between walls 2. The fixing sleeve 24 comprises a pair of first stopping pieces 5. Each of the first stopping pieces 5 bends and extends respectively from a bottom of said first notch 4 toward a top of the fixing sleeve 24. A gap 51 forms between a first stopping piece 5 and a wall 2. During installation, the circuit board 10 is retained between an end of the first stopping piece 5 and the second stopping piece 6, as shown in FIG. 8. When removing the power component 20, pressing the pair of the first stopping pieces 5 in the direction toward each other to deform so that the first stopping pieces 5 exit the positioning hole 121.

In the present embodiment, the size of the first notch 4 gradually decreases from the top toward the bottom 1 of the fixing sleeve 24. The first notch 4 can increase the elasticity range of the first wall 2 and the second wall. During installation, expanding the pair of walls 2 in the direction away from each other so that the drive unit 23 is accommodated in the receiving space 3.

In the present embodiment, the receiving space 3 of the fixing sleeve 24 is provided with steps 7. An end of the wall 2 extends radially toward the center of the receiving space 3 to form a stopping block 50. During installation, the drive unit 23 is secured between the steps 7 and the stopping blocks 50.

In the present embodiment, each of the bottom of the wall 2 is provided with a first through hole 60 that is in communication with the receiving space 3. Said first through hole 60 is provided to help reduce the weight of the aircraft vehicle 100, decrease the use of material and save cost.

Furthermore, a projected piece 9 is provided on an outer surface of a first wall 2, as shown in FIG. 6. Accordingly, an inner wall of the positioning hole 121 is provided with a positioning groove 123, as shown in FIG. 7. During installation, said projected piece 9 is accommodated in the positioning groove 123 to prevent the fixing sleeve 24 from rotating within the positioning hole 121 along its circumferential direction, so as to secure the power component 20 on the circuit board 10.

In the present embodiment, the aircraft vehicle 100 is a four-rotor aircraft; accordingly, the aircraft 100 comprises four power components 20. For the simplicity and clarity of illustration, the four power components 20 are grouped into a pair of first power components 20, and a pair of second power components 20'.

As shown in FIG. 7, the circuit board 10 comprises a main body 11, a pair of first support arms 12 that corresponds to the pair of the first power components 20, and a pair of second support arms 12' that corresponds to the pair of the second power components 20'. The main body 11 is mounted with an electronic component 13. The first support arms 12 and the second support arms 12' extend away respectively from edges of the main body 11 in a radial direction. Wherein, one of the first support arms 12 and one of the second support arms 12' are aligned on a straight line, and the other one of the first support arms 12 and the other one of the second support arms 12' are aligned on another straight line. Accordingly, the circuit board 10 comprises two pairs of positioning holes 121 respectively provided on ends of the first support arms 12 and ends the second support arms 12'.

In the present embodiment, the first support arms 12 and the second support arms 12' form a X-shape with the main body 11 as a center of said X-shape. In another words, the first support arms 12 and the second support arms 12' together form a cross.

When the aircraft vehicle 100 is in a flight mode, the drive units that are on the same line of one first power component 20 and one second power component 20' rotate counterclockwise, while the drive units 23 that are on the same line of another first power component 20 and another second power component 20' rotate clockwise. Therefore, when the aircraft vehicle 100 is in flight, gyroscopic effects and aerodynamic torque effect is offset.

In the present embodiment, the first support arms 12 and the second support arms 12' are provided respectively with hollow regions 122. A hollow region 122 is located between a positioning hole 121 and the main body 11.

As shown in FIG. 3 and FIG. 4, as a further improvement, the aircraft vehicle 100 further comprises a battery 30 and a battery cover 40. During installation, the battery 30 is secured on the main body 11 of the circuit board 10. The battery cover 40 shields the battery 30 and is secured on the circuit board 10, as shown in FIG. 3. The battery cover 40 effectively protects the battery 30 from damages.

As shown in FIG. 4, specifically, the battery cover 40 comprises a cover body 41 and a plurality of hooks 42 corresponding to the hollow regions 122. A hook 42 is formed by extending and projecting from an edge of an opening of the cover body 41. During installation, the battery 30 is accommodated inside the cover body 41, and the hooks 42 insert into the corresponding hollow regions 122 to hold against the bottom of the circuit board 10, thereby securing the battery cover 40 on the circuit board 10.

In the present embodiment, the cover body 41 comprises a plurality of second through holes 43. The battery 30 dissipates heat through the second through holes 43. Said second through holes 43 are also beneficial to reduce the weight of the aircraft vehicle 100, decrease the use of material and save cost.

Figure 9:
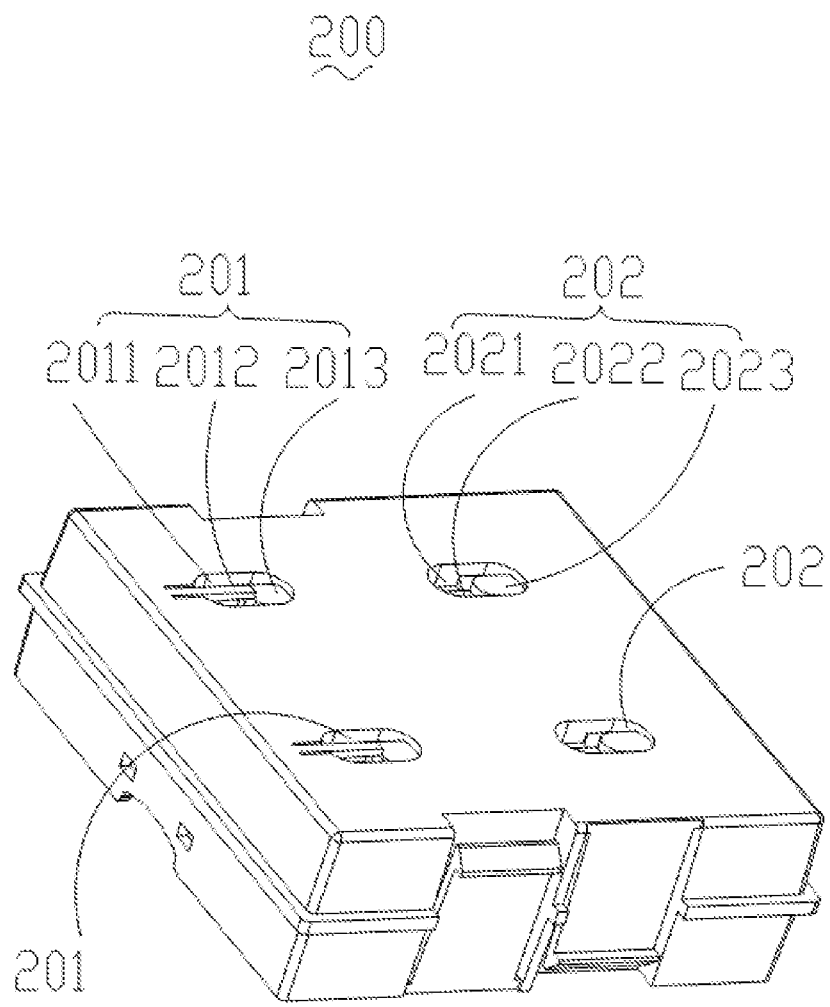
FIG. 9 is a schematic diagram of the body of the support box of in FIG. 1.
Figure 10:
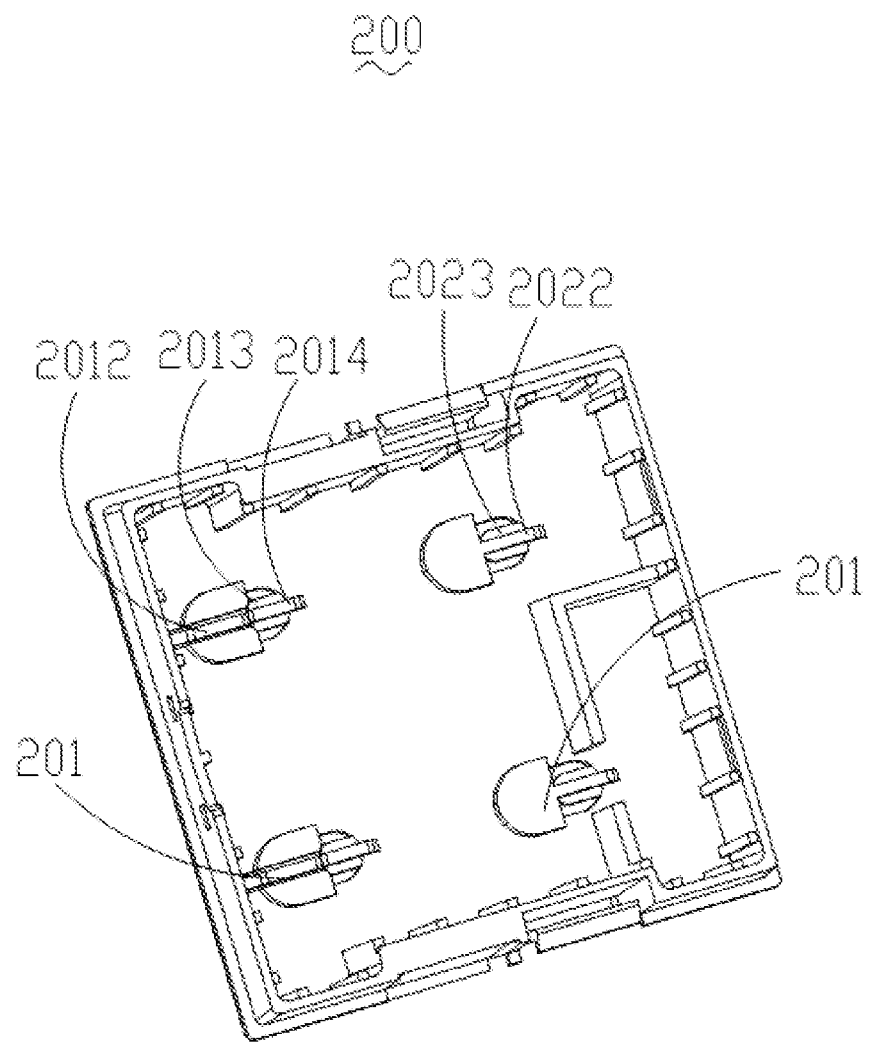
FIG. 10 is another schematic diagram of the body of the support box of FIG. 1 from another direction.

As shown in both FIGS. 9 and FIG. 10, a top of the body 200 has a pair of first positioning portions 201 corresponding to the first power components 20, and a pair of second positioning portions 202 corresponding to the second power components 20'. Accordingly, the fixing sleeve 24 further comprises a pair of retaining pieces 8 at the bottom 1 of the fixing sleeve 24, as shown in FIG. 5 and FIG. 6. During installation, a first positioning portion 201 engages with the corresponding retaining piece 8 of a first power component 20 of the fixing sleeve 24, to support the first power component 20; and the second positioning portion 202 engages with the corresponding retaining piece 8 of a second power component 20' of the fixing sleeve 24, to support the second power component 20', as shown in FIG. 1.

Figure 11:
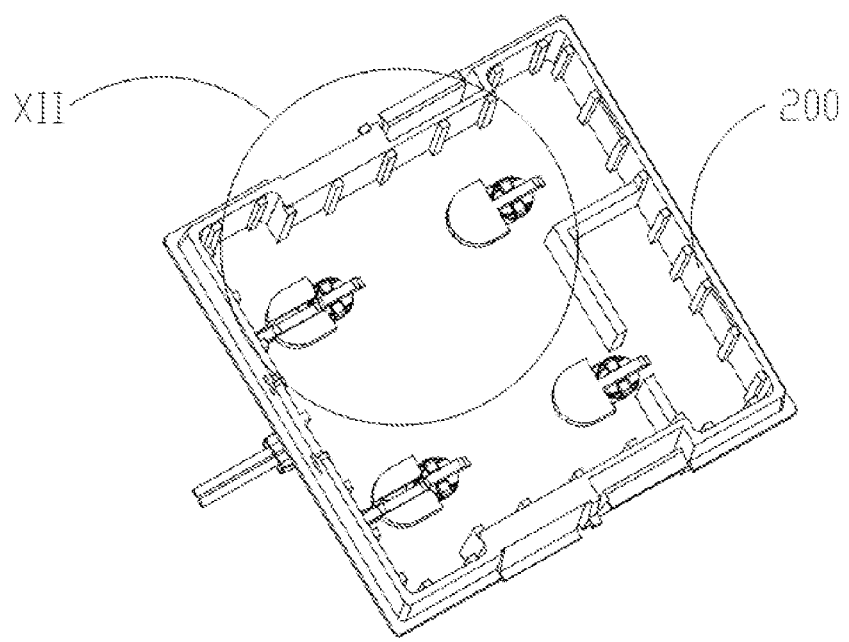
FIG. 11 is a schematic diagram of the bottom of a support box wherein the aircraft vehicle is mounted thereof.
Figure 12:
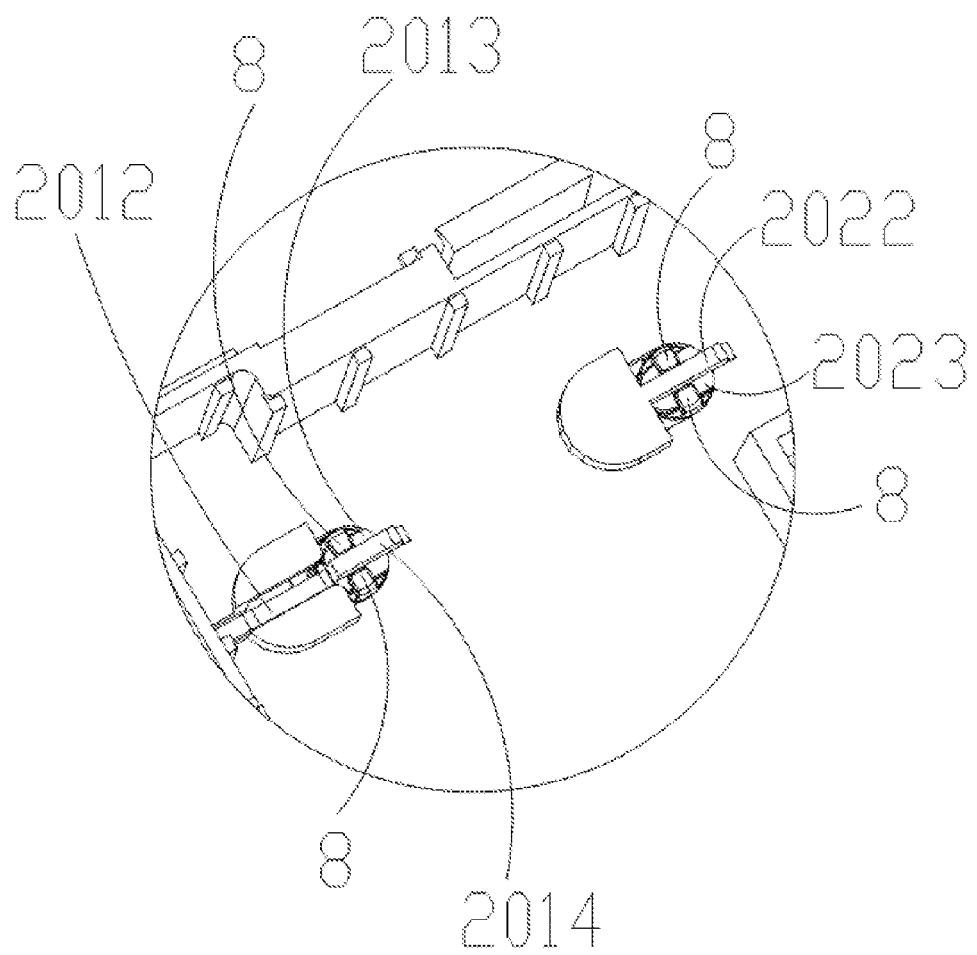
FIG. 12 is an enlarged view of the portion in the circle XII as shown in FIG. 11.
Figure 13:
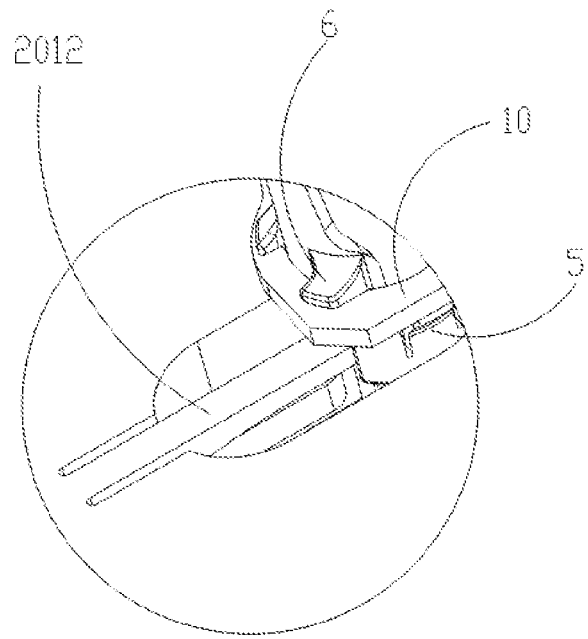
FIG. 13 is an enlarged view of the portion in the circle XIII as shown in FIG. 1.

Specifically, each of the first positioning portions 201 comprises a first positioning groove 2011, a tongue piece 2012 and a first locking block 2013. Said tongue piece 2012 extends from an end of the first positioning groove 2011 in the direction parallel to the top surface of the circuit board 10 toward the second positioning portion 202. The first locking block 2013 is provided in a recess on another end of the first positioning groove 2011. A bottom of the first locking bock 2013 is provided with a locking piece 2014, as shown in FIG. 10. During installation, said tongue piece 2012 is clamped between the retaining pieces 8 of the fixing sleeve 24; the bottom 1 of the fixing sleeve 24 presses the tongue piece 2012; the fixing sleeve 24 slides along the tongue piece 2012, and clamps and is secured at the bottom of the first locking block 2013; and the locking piece 2014 is clamped between the retaining pieces 8 of the fixing sleeve 24, as shown in FIG. 11 and FIG. 12. As such, the bottom 1 of the fixing sleeve 24 separates from the tongue piece 2012; the tongue piece 2012 bounces, and the tongue piece 2012 stops and retains the fixing sleeve 24, so that said first power component 20 is secured on the body 200, as shown in FIG. 13.

During disassembly, the tongue piece is pressed by a finger, so that the fixing sleeve 24 slides along the tongue piece 2013 in a direction away from the locking block 2013, and the circuit board 10 separates from the body 200.

As shown in both FIGS. 9 and 10, each of the second positioning portions 202 comprises a second positioning groove 2021, a guiding piece 2022 and a second locking block 2023. The guiding piece is provided in a recess of the second positioning groove 2021 and connects two ends of the second positioning groove 2021. The second locking block 2023 is accommodated in the second positioning groove 2021. The second locking piece 2023 is provided at an end further away from the first positioning portion 201, and is on top of the guiding piece 2022. During installation, the guiding piece 2022 is clamped between the retaining pieces 8 of the fixing sleeve 24 of the second power component 20'; the fixing sleeve 24 slides along the guiding piece 2022, and clamps and is secured at a bottom of the second locking block 2023, as shown in FIG. 11 and FIG. 12.

In the present embodiment, during the installation of the first power component 20 and the second power component 20' on the body 200, both bottoms of the first power component 20 and the second power component 20' are inserted simultaneously into the respectively corresponding first positioning groove 2011 and the second positioning groove 2021, so that the tongue piece 2012 of the first positioning groove 2011 is clamped between the corresponding retaining pieces 8 of the fixing sleeve 24, and the tongue piece 2012 is pressed to be at the same level of the corresponding first locking block 2013. The guiding piece 2022 of the second positioning groove 2021 is clamped between the retaining pieces 8 of the fixing sleeve 24 corresponding to the second power component 20'. When the circuit board 10 is pushed, the fixing sleeve of the first power component 20 slides along the corresponding tongue piece 2012; at the meantime, the fixing sleeve of the second power component 20' slides along the corresponding guiding piece 2022. When the retaining pieces 8 of the fixing sleeve 24 of the first power component 20 slide into the bottom of the first locking block 2013 and is clamped and secured at the bottom of the first locking block 2013, the retaining pieces 8 of the fixing sleeve 24 of the second power component 20' slide into the bottom of the second locking block 2023 and is clamped and secured at the bottom of the second locking block 2023. At the same time, the tongue piece 2012 bounces and stops the fixing sleeve 24, so that the circuit board 10 is secured on the body 200.

As shown in FIG. 5, in the present embodiment, the retaining piece 8 extends from a bottom of the fixing sleeve 24 toward a top of the fixing sleeve 24. An end of the retaining piece 8 bends and extends radially towards a center direction of the fixing sleeve 24. A second notch 81 is formed between the ends of the retaining pieces 8. During installation, the bottom 1 of the fixing sleeve 24 of the first power component 20 presses the corresponding tongue piece 2012 of the first positioning portion 201; the tongue piece 2012 is accommodated in the second notch 81 of the corresponding fixing sleeve, so that the retaining pieces 8 of the fixing sleeve slide along the tongue piece 2012 and are clamped and secured at the bottom of the corresponding first locking block 2013. The guiding piece 2022 of the second positioning portion 202 is accommodated in the second notch 81 of the corresponding fixing sleeve 24, so that the retaining pieces 8 of the fixing sleeve 24 slide along the guiding piece 2022 and are clamped and secured at the bottom of the corresponding second locking piece 2023, as shown in FIG. 12.

Figure 14:
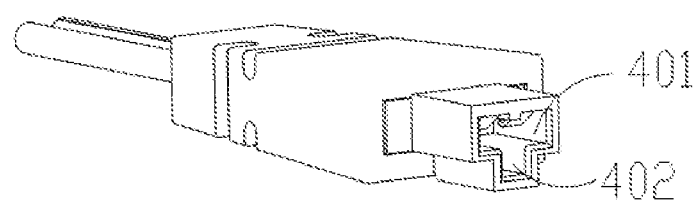
FIG. 14 is a schematic diagram of the connector of FIG. 1.

As shown in FIG. 4 and FIG. 7, as a further improvement, the circuit board 10 further comprises a connection terminal 14, and a projecting piece 15 at a bottom of the circuit board 10; a bottom of a connector 400 corresponding to the connection terminal 14 is provided with a receiving slot 402 which is in communication with a jack 401 of the connector 400, as shown in FIG. 14. During installation, the connection terminal 14 is inserted into the jack 401, and the projecting piece 15 is accommodated in the receiving slot 402, so that the connector 400 is electrically connected to the connection terminal 14.

The projecting piece 15 and the receiving slot 402 can effectively prevent the reverse plugging of connector 400.

In the present embodiment, the connection terminal 14 comprises a pair of copper foils 141 printed on the circuit board 10. The connection terminal 14 is electrically connected to the battery 30 to charge said battery 30. When the aircraft vehicle 100 is in need of charging, the connection terminal 14 directly charges said battery 30 through the connector 400, therefore an user does not need to take the battery 30 out and it's a more convenient experience. Because the connection terminal 14 is a pair of copper foils 141 printed on the circuit board 10, this reduces the volume and weight of the aircraft vehicle 100.

During installation of the aircraft vehicle 100, the rotor 21 is connected with the drive unit 23 through the rotary shaft 22. The drive unit is positioned and secured within the fixing sleeve 24. When the fixing sleeve 24 is inserted into the positioning hole 121 of the circuit board 10, the circuit board 10 is retained between the first stopping piece 5 and the second stopping piece 6 of the fixing sleeve 24. The retaining pieces 8 of the fixing sleeve 24 are inserted into the corresponding first positioning groove 2011 and the second positioning groove 2021 of the body 200, and the circuit board is pushed so that the tongue piece 2012 of the first positioning groove 2011 is clamp by the corresponding fixing sleeve 24, and the retaining pieces 8 of the fixing sleeve 24 are secured by either the first locking block 2013 or the second locking block 2023.

During disassembly of the aircraft vehicle 100, the tongue piece 2012 is pressed so that the retaining pieces 8 of the fixing sleeve 24 slide along the corresponding tongue piece 2012 or the guiding piece 2022, to exit the first locking block 2013 or the second locking block 2023, so that the circuit board 10 with the installed fixing sleeve 24 separates from the body 200. The first stopping piece 5 of the fixing sleeve 24 is pressed, so that the fixing sleeve 24 with the motor exits the positioning hole 121 of the circuit board 10. The first wall and the second wall are pushed away from each other to allow the separation of the motor.

The aircraft vehicle 100 is provided with a fixing sleeve 24 which secures the drive unit 23 on the circuit board 10; the fixing sleeve 24 is securely positioned and connected on the circuit board 10 through the combined action of the first stopping piece 5 and the second stopping piece 6. Thus, when the aircraft vehicle 100 falls or collides with another object, the fixing sleeve 24 ensures that the drive unit 23 does not separate from the circuit board 10, therefore enhancing the performance of the aircraft vehicle 100.

During installation of the aircraft vehicle 100, through the elastic deformation of the fixing sleeve 24, the motor is easily secured in the fixing sleeve 24, and the fixing sleeve 24 is secured on the circuit board. During disassembly, the tongue piece 2012 only needs to be pressed by a finger to allow separation of circuit board 10 from the body 200, and separation of the fixing sleeve 24 from the circuit board 10 is achieved by pressing the fixing sleeve 24. As such, the aircraft vehicle disclosed herein greatly enhances the ease of installation and disassembly and increases the efficiency of assembly and maintenance.

The provision of battery cover 40 to shield the battery 30 of the aircraft vehicle not only protects the battery 30 but also increase the service life of the battery 30.

Again the provision of copper foils 411 on the circuit board 10 as a charging port of the aircraft vehicle enhances the convenience of use by allowing online charging of the battery and eliminating the need to remove the battery 30 for charging.

The descriptions above are intended to be illustrative, not limiting. Thus, it will be apparent to one skilled in the art that modifications may be made without departing from the protection scope of the claims set out below.

What is claimed is:

1. An aircraft vehicle comprising: a circuit board and at least one power component mounted on said circuit board; wherein each of the at least one power component comprises a rotor, a drive unit and a fixing sleeve; wherein the drive unit is electrically connected to said circuit board and drives the rotor to rotate; wherein the fixing sleeve comprises a receiving space with an opening at a top; wherein the fixing sleeve comprises at least one first stopping piece and at least one second stopping piece projected on an outer surface of the fixing sleeve; wherein the drive unit is configured to be accommodated in the receiving space and is configured to be secured in the fixing sleeve; wherein the circuit board comprises at least one positioning hole corresponding to the power component; and wherein the fixing sleeve is configured to pass through the positioning hole so that the circuit board is retained between the first stopping piece and the second stopping piece.

2. The aircraft vehicle of claim 1, wherein the fixing sleeve comprises a base and a pair of oppositely positioned walls; wherein each wall extends from an edge of the bottom; wherein the base and the walls together form the receiving space; wherein the second stopping piece is provided on an outer surface of the wall; and wherein the first stopping piece is provided between said walls.

3. The aircraft vehicle of claim 2, wherein a pair of oppositely positioned first notches is formed between the walls; wherein the fixing sleeve comprises a pair of first stopping pieces; wherein each of the first stopping pieces bends and extends respectively from a bottom of the first notch toward a top of the fixing sleeve; wherein the circuit board is configured to be secured between an end of the first stopping piece and the second stopping piece.

4. The aircraft vehicle of claim 3, wherein a size of the first notch gradually decreases from a top toward a bottom of the fixing sleeve.

5. The aircraft vehicle of claim 2, wherein a gap forms between said first stopping piece and the walls.

6. The aircraft vehicle of claim 2, wherein an inside of the receiving space of the fixing sleeve is provided with steps; wherein an end of the wall extends radially toward a center of the receiving space to form a stopping block; wherein the drive unit is configured to be secured between the steps and the stopping block.

7. The aircraft vehicle of claim 2, wherein a projected piece is provided on an outer surface of the wall; wherein an inner wall of the positioning hole is provided with a positioning groove in communication with the positioning hole; wherein the projected piece is configured to be accommodated in the positioning groove.

8. The aircraft vehicle of claim 1, wherein the aircraft vehicle comprises a pair of first power components and a pair of second power components; wherein the circuit board further comprises a main body, a pair of first support arms that corresponds to the pair of the first power components, and a pair of second support arms that corresponds to the pair of the second power components; wherein the first support arms and the second support arms extend away respectively from edges of the main body in a radial direction; wherein one of the first support arms and one of the second support arms are aligned on a straight line, and the other one of the first support arms and the other one of the second support arms are aligned on another straight line; wherein the circuit board further comprises two pairs of positioning holes respectively provided on ends of the first support arms and ends the second support arm.

9. The aircraft vehicle of claim 8, wherein the first support arms and the second support arms form a X-shape with the main body as a center of said X-shape.

10. The aircraft vehicle of claim 8, wherein the first support arms and the second support arms are provided respectively with hollow regions.

11. The aircraft vehicle of claim 10, wherein the aircraft vehicle further comprises a battery and a battery cover; wherein the battery is configured to be secured on the main body of the circuit board; wherein the battery cover shields the battery and is configured to be secured on the circuit board.

12. The aircraft vehicle of claim 11, wherein the battery cover comprises a cover body and a plurality of hooks corresponding to the hollow regions; wherein the hooks are formed by extending and projecting from an edge of the cover body; wherein the battery is configured to be accommodated inside the cover body, and the hooks are configured to insert into the corresponding hollow regions to hold against a bottom of the circuit board.

13. The aircraft vehicle of claim 12, wherein the cover body comprises a plurality of second through holes.

14. The aircraft vehicle of claim 8, wherein the aircraft vehicle is configured to be mounted on a support box; wherein the support box comprises a body with an opening at its bottom; wherein a top of the body is provided with a pair of first positioning portions corresponding to the first power components, and a pair of second positioning portions corresponding to the second power components; wherein the fixing sleeve further comprises a pair of retaining pieces at a bottom of the fixing sleeve; wherein the first positioning portion is configured to engage with the corresponding retaining pieces of the fixing sleeve of the first power component, and wherein the second positioning portion is configured to engage with the corresponding retaining pieces of the second power component of the fixing sleeve, to secure the aircraft vehicle on the support box.

15. The aircraft vehicle of claim 14, wherein each of the first positioning portions comprises a first positioning groove, a tongue piece and a first locking block; wherein the tongue piece extends from an end of the first positioning groove in a direction parallel to the top surface of the circuit board; wherein the first locking block is provided in a recess on another end of the first positioning groove; wherein the retaining pieces of the fixing sleeve of the first power component are configured to clamp and be secured at a bottom of the first locking piece, and the tongue piece is configured to stop and retain the bottom of the retaining pieces of the fixing sleeve.

16. The aircraft vehicle of claim 15, wherein each of the second positioning portions comprises a second positioning groove, a guiding piece and a second locking block; wherein the guiding piece is provided in a recess of the second positioning groove and connects two ends of the second positioning groove; wherein the second locking piece is provided at an end further away from the first positioning portion, and is on top of the guiding piece; wherein the retaining pieces of the fixing sleeve of the second power component are configured to clamp and be secured at a bottom of the second locking block.

17. The aircraft vehicle of claim 16, wherein the retaining piece extends from a bottom of the fixing sleeve away from a top of the fixing sleeve; wherein an end of the retaining piece bends and extends radially towards a center direction of the fixing sleeve; wherein a second notch is formed between the ends of the retaining pieces; wherein the bottom of the fixing sleeve of the first power component is configured to press the corresponding tongue piece of the first positioning portion; wherein said tongue piece is configured to be accommodated in the second notch of the corresponding fixing sleeve, so that the retaining pieces of the fixing sleeve are configured to slide along the tongue piece and are configured to clamp and be secured at the bottom of the corresponding first locking piece; wherein the guiding piece of the second positioning portion is configured to be accommodated in the second notch of the corresponding fixing sleeve, so that the retaining pieces of the fixing sleeve are configured to slide along the guiding piece and are configured to clamp and be secured at the bottom of the corresponding second locking piece.

18. The aircraft vehicle of claim 14, wherein the support box further comprises a bottom plate; wherein the bottom plate is provided at a bottom of the body and shields the body.

19. The aircraft vehicle of claim 1, wherein the circuit board further comprises a connection terminal on the circuit board, and a projecting piece at a bottom of the circuit board; wherein a connector corresponding to the connection terminal is provided with a receiving slot which is in communication with a jack of the connector; wherein the connection terminal is configured to insert into the jack, and the projecting piece is configured to be accommodated in the receiving slot, so that the connector is electrically connected to the connection terminal.

20. The aircraft vehicle of claim 18, wherein the connection terminal comprises a pair of copper foils printed on the circuit board.

21. The aircraft vehicle of claim 19, wherein the connection terminal is a charging terminal of the aircraft vehicle.

22. The aircraft vehicle of claim 1, wherein the drive unit is a motor, and the motor is cylindrical in shape.

23. A fixing sleeve with the following characteristics: wherein the fixing sleeve is configured to secure a power component of an aircraft vehicle on a circuit board; wherein the power component comprises a rotor and a drive unit that drives the rotor to rotate; wherein the circuit board comprises positioning holes; wherein the drive unit is configured to be electrically connected to the circuit board; wherein the fixing sleeve comprises a receiving space with an opening at a top;

wherein said fixing sleeve further comprises at least one first stopping piece and at least one second stopping piece projected on an outer surface of the fixing sleeve; wherein the drive unit is configured to be accommodated in the receiving space and secured in the fixing sleeve; wherein the fixing sleeve is configured to pass through the positioning hole so that the circuit board is configured to be retained between the first stopping piece and the second stopping piece.

24. The fixing sleeve of claim 23, wherein the fixing sleeve comprises a base and a pair of oppositely positioned walls; wherein each said wall extends from an edge of the bottom; wherein the base and the walls together form the receiving space; wherein the second stopping piece is provided on an outer surface of the wall; wherein the first stopping piece is provided between said walls.

25. The fixing sleeve of claim 24, wherein a pair of oppositely positioned first notches is formed between the walls; wherein the fixing sleeve comprises a pair of first stopping pieces; wherein each of the first stopping pieces bends and extends respectively from a bottom of the first notch toward a top of the fixing sleeve; wherein the circuit board is configured to be retained between an end of the first stopping piece and the second stopping piece.

26. The fixing sleeve of claim 25, wherein the size of the first notch gradually decreases from a top toward a bottom of the fixing sleeve.

27. The fixing sleeve of claim 24, wherein a gap forms between said first stopping piece and the walls.

28. The fixing sleeve of claim 24, wherein an inside of the receiving space of the fixing sleeve is provided with steps; wherein an end of the wall extends radially toward a center of the receiving space to form a stopping block; wherein the drive unit is configured to be secured between the steps and the stopping block.

29. The fixing sleeve of claim 24, wherein a projected piece is provided on an outer surface of the wall; wherein an inner wall of the positioning hole is provided with a positioning groove in communication with the positioning hole; wherein the projected piece is configured to be accommodated in the positioning groove.

30. The fixing sleeve of claim 23, wherein a bottom of the wall is provided with a first through hole which is in communication with the receiving space.

* * * * *